US006705665B1

(12) United States Patent
Buecker et al.

(10) Patent No.: US 6,705,665 B1
(45) Date of Patent: Mar. 16, 2004

(54) ELECTROMOTIVELY ACTUATED LOCKING SYSTEM AS WELL AS METHOD FOR CONTROLLING SAME

(75) Inventors: Rolf Buecker, Coburg (DE); Juergen Seeberger, Baunach (DE); Joerg Uebelein, Grub am Forst (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/088,255

(22) PCT Filed: Sep. 12, 2000

(86) PCT No.: PCT/DE00/03214

§ 371 (c)(1), (2), (4) Date: Jul. 16, 2002

(87) PCT Pub. No.: WO01/23693

PCT Pub. Date: Apr. 5, 2001

(30) Foreign Application Priority Data

Sep. 14, 1999 (DE) ........................................ 199 44 963

(51) Int. Cl.[7] ................................................ B62D 25/00
(52) U.S. Cl. ......................... 296/146.9; 49/503; 70/237
(58) Field of Search ........................... 296/146.5, 146.9, 296/39.1; 49/503; 70/237, 277, 278.7, 279.1, 280

(56) References Cited

U.S. PATENT DOCUMENTS

| | | |
|---|---|---|
| 5,678,869 A | 10/1997 | Yoshikuwa |
| 5,746,076 A | 5/1998 | Inoue |
| 5,902,004 A | 5/1999 | Waltz et al. |
| 6,059,328 A | 5/2000 | Gomi |
| 6,098,432 A | 8/2000 | Spies |

FOREIGN PATENT DOCUMENTS

| | | |
|---|---|---|
| DE | 196 54 956 A1 | 3/1998 |
| DE | 198 45 723 A1 | 4/1999 |
| EP | 0 686 745 A2 | 12/1995 |
| EP | 0 894 920 A1 | 2/1999 |
| GB | 2 271 374 A | 4/1994 |
| WO | WO 98/01643 | 1/1998 |

OTHER PUBLICATIONS

International Search Report of PCT/DE00/03214, dated Feb. 13, 2001.
International Preliminary Examination Report of PCT/DE00/03214, dated Feb. 8, 2002.
English translation of the International Preliminary Examination Report for International Application No. PCT/DE00/03214.

*Primary Examiner*—Joseph D. Pape
(74) *Attorney, Agent, or Firm*—Christie, Parker & Hale, LLP

(57) ABSTRACT

An electromotively activated locking system for a motor vehicle door includes an outer door opener, at least one inner door opener, a lock mechanism that can be regulated by a motor drive and an element separating the wet and dry areas. The lock parts of the primary lock mechanism (3) are located in the damp area. An electrical device for determining the locking state of the primary and secondary lock mechanisms (3, 5) and the motor drive (2) are located in the dry area. For controlling the locking system, a logic alignment is carried out between the locking states of the primary locking mechanism and the locking states of the secondary locking mechanism and certain lock functions are then released or blocked for control in dependence on this logic alignment.

11 Claims, 6 Drawing Sheets

Fig. 4
Fig. 5
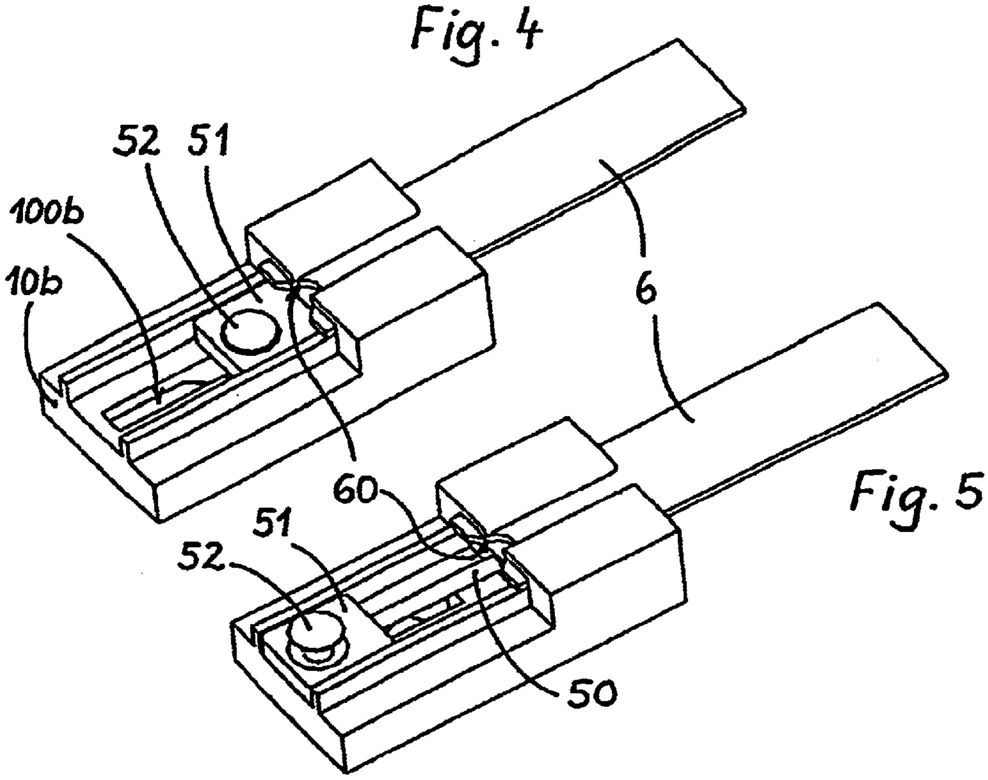
Fig. 6
Fig. 7
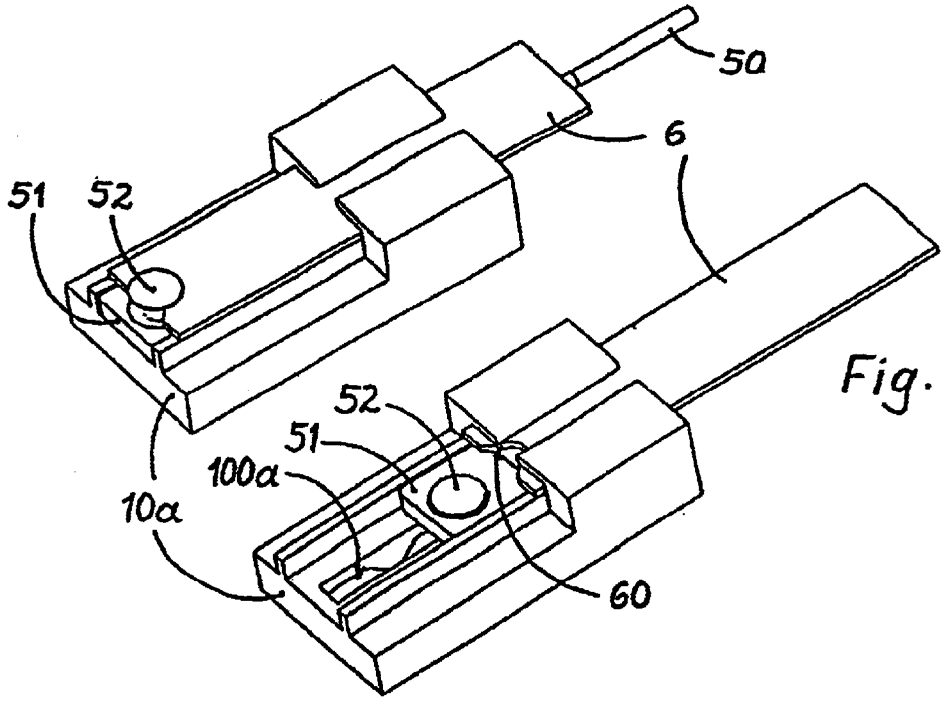

ELECTROMOTIVELY ACTUATED LOCKING SYSTEM AS WELL AS METHOD FOR CONTROLLING SAME

CROSS-REFERENCE TO RELATED APPLICATION

This application claims priority of International application number PCT/DE00/03214, filed Sep. 12, 2000, which in turn claims priority of German application number 199 44 963.5, filed Sep. 14, 1999.

FIELD OF THE INVENTION

The invention relates to an electromotively actuated locking system as well as to a method for controlling same. The invention is characterized by its good ability to adapt to different functions of the door opener and by a simple mechanical construction.

BACKGROUND

From GB 2 271 374 A a locking system for a motor vehicle is known in which the adjusting movements of the outer door opener and the inner door opener are transferred through a Bowden cable to the primary locking mechanism (locking pawl and rotary catch). The inner door opener is thereby connected direct to the locking pawl either through the Bowden cable or through a swivel mounted fork which belongs to the secondary locking mechanism and forms one structural unit with the outer door opener and a motorized drive. Through a connection between the fork and locking pawl the swivel position of the fork is dependent on the state of the primary locking mechanism. In this way the fork reproduces the locking state.

With the described locking system the inner door opener is always coupled to the mechanical active chain so that different functions of the inner opener, such as “child lock” and “security lock” cannot be reproduced. Furthermore positioning the electrical components in the wet space of the outer door opener then requires measures to protect against damp conditions.

Furthermore—as a result of the general functioning principle of vehicle locks—parts of the primary locking mechanism (e.g. rotary catch and locking pawl) are regularly and parts of the secondary locking mechanism (force transfer elements connected to the door openers) are temporarily located in different locking states. This takes place for example if the outer opener of a closed vehicle door is pulled (secondary locking mechanism located in the “unlocked” state) and thus a setting command is provided for unlocking and opening the locking parts of the primary locking mechanism. After the lock drive has executed the setting command, the primary and secondary locking mechanisms are located in the same locking state, namely until the outer opener of the door which has meanwhile opened has been let go again. The secondary locking mechanism thereby passes (generally under the action of spring force) into the “locked” locking state. When the driver door is opened this must however not lead to a locking movement of the primary locking mechanism because then the door may be unintentionally pushed to and the driver become locked out of the vehicle. In order to prevent such happenings in the known locking devices mechanical blocks are provided which would not permit the lock drive to be governed in this way under the conditions described.

An analogous process is where the locking button of an open door is pressed down whereby the secondary locking mechanism is moved into the “locked” state. Activation of the lock drive is again to be prevented.

SUMMARY OF THE INVENTION

The object of the invention is to develop an electromotively operated locking system for a motor vehicle door which with regard to the motorized drive ensures extensive freedom in the structural space (variable installation site for the drive) and incurs less expense for the electrical and electronic parts without however having to make any adaption to the external interfaces, i.e. the door opener or locking parts of the primary locking mechanism. Furthermore a simplified more cost-effective construction of the parts of the locking system should be achieved by omitting mechanical locks to prevent inadmissible setting commands.

According to the invention the means for determining the locking state are mounted in the dry space of the vehicle door and are split up into at least two sub-groups and are associated with the secondary and primary locking mechanisms, and also the motorized drive. The means for determining the position of the locking parts (rotary catch and locking pawl) of the primary locking mechanism are mounted between the locking parts and the motorized drive and the means for determining the locking state of the secondary locking mechanism are mounted between the motorized drive and the door operating elements, namely the inner door opener and outer door opener.

By arranging the means for determining the locking state in the dry space it is possible to cut down on the expenditure required for expensive wet space designs while at the same time ensuring a high functional reliability.

The means for determining the locking state of the primary locking mechanism have position generators which are arranged on a movable coupling element or the like connected to a lock part. These are associated with position recorders fixed on the body wherein the coupling element engages through the wet/dry space partition. The passage of the coupling element which serves at the same time as the lock actuator, through the wet/dry space partition is sealed.

In another embodiment, at least one of the sub-groups for determining the locking state forms one structural unit with a motorized lock drive mounted in the dry space of the door body. The sub-groups can however also form one structural unit with the door openers.

The locking states associated with the inner door opener differ from the locking states which are associated with the outer door opener. Thus for example the function “locked” can only be achieved through the outer door opener and the child lock can only perform its action on the inner door opener. For determining the locking state it is expedient to use parts which can move in translation or rotation and which are in active connection with the secondary locking mechanism (e.g. slider, lever mechanism, Bowden cables) and whose position can be determined by a mechanical scanning system or through a sensor operating without contact.

In the event of mechanically scanning a curved or slide path by means of a for example pin-like scanner which is pretensioned spring elastically against the path and is coupled to the secondary locking mechanism the scanner changes its position relative to a manual shift plane so that with the failure of the electric drive (through manual operation) a part moved by a door opener can engage on the scanner and can thus act through the secondary locking mechanism on the locking parts of the primary locking mechanism. The scanner thereby fulfils the function of a coupling element between the door opener and the locking parts of the primary locking mechanism which can occupy two end positions. The definition of the permissible lock states thus takes place in dependence on the adjustment position of a part of the locking mechanism which supports the scanner (the coupling element). Thus a locking state is disconnected or blocked through the position of the coupling element which is dependent on the adjustment position of the lock.

Furthermore there is the possibility of disconnecting and blocking locking states, thus moving a coupling element into an entrainment position relative to a part connected to a door opener and vice versa, through using magnetic forces. For this, for example, permanent magnets can be associated with those adjusting positions for which the coupling element is to be brought into an entrainment position. The coupling element or a part connected thereto is thus attracted by the magnet on reaching a specific position. After overrunning the magnet the coupling element returns to the release position as a result of gravity or a spring force acting in the opposite direction.

A mechanical active connection between the locking cylinder and locking mechanism for the purpose of emergency operation in the "anti-theft" locking state can likewise be produced in order to ensure access to the vehicle in the event of failure of the electric on-board power. The coupling element is thereby brought by the locking cylinder into an access position which permits the introduction of an adjusting movement starting from the outer door opener.

In another embodiment, determining a position can be carried out without contact by means of a magneto-resistive or optical sensor. For this the means for determining the locking state consist of a signal-generating element which is connected to a (movable) part which is in active connection with the primary or secondary locking mechanism, and of a sensor fixed on the base and able to determine from this the relative position between the signal generating-element and the sensor and thus the actual locking state.

In another embodiment, the sensor is associated with a part of the primary locking mechanism so that determining the locking state is carried out by scanning the position of this part., If in addition to the "OPEN" and "CLOSED" positions the "PRE-CATCH POSITION" is also detected then this signal can be used to control a so-called pull-to aid which closes the vehicle door in motorized fashion.

The construction described for the locking system where both the locking states of the primary and also of the second locking mechanism are determined produces a control method which can dispense with the mechanical parts otherwise necessary to prevent inadmissible locking states of the primary locking mechanism. According to this method for controlling an electromotively actuated locking system it is proposed that a logic alignment be carried out between the locking states of the primary locking mechanism and the locking states of the secondary locking mechanism and that the inadmissible locking functions be blocked in dependence on the result of this logic alignment, i.e. the motorized lock drive is not controlled in this case. The drive can be controlled for implementing permissible locking functions.

A logic alignment of this kind should always be undertaken after a control command has been triggered for the locking mechanism and/or after an adjusting movement of at least one part of the locking mechanism has been carried out. For triggering the control command it is generally a question of operating a door opener whereby a signal is generated through a micro switch or sensor.

In another embodiment, the logic alignment can be carried out particularly advantageously by means of a central door electronics unit which—in the event of a link within a bus-system—can also take into consideration information on the locking states of other door, locks or the locking state of one or more window panes.

BRIEF DESCRIPTION OF DRAWINGS

The invention will now be explained with reference to the embodiments shown in the drawings in which:

FIG. 4 shows a perspective view of parts of the locking system analogous with FIGS. 3*a* to 3*c* for an inside door opener in the "anti-theft security" locking state;

FIG. 5 shows a perspective view of parts of the locking system analogous with FIGS. 3*a* to 3*c* in the "Open" locking state wherein this lock position was reached through motorization;

FIG. 6 shows a perspective view of parts of the locking system analogous with FIGS. 3*a* to 3*c* in the "Open" locking state, wherein this locking position was reached manually through emergency operation;

FIG. 7 shows a perspective view of parts of the locking system analogous with FIGS. 3*a* to 3*c* for an outside door opener in the "anti-theft security" locking state;

DETAILED DESCRIPTION

Figure 1:
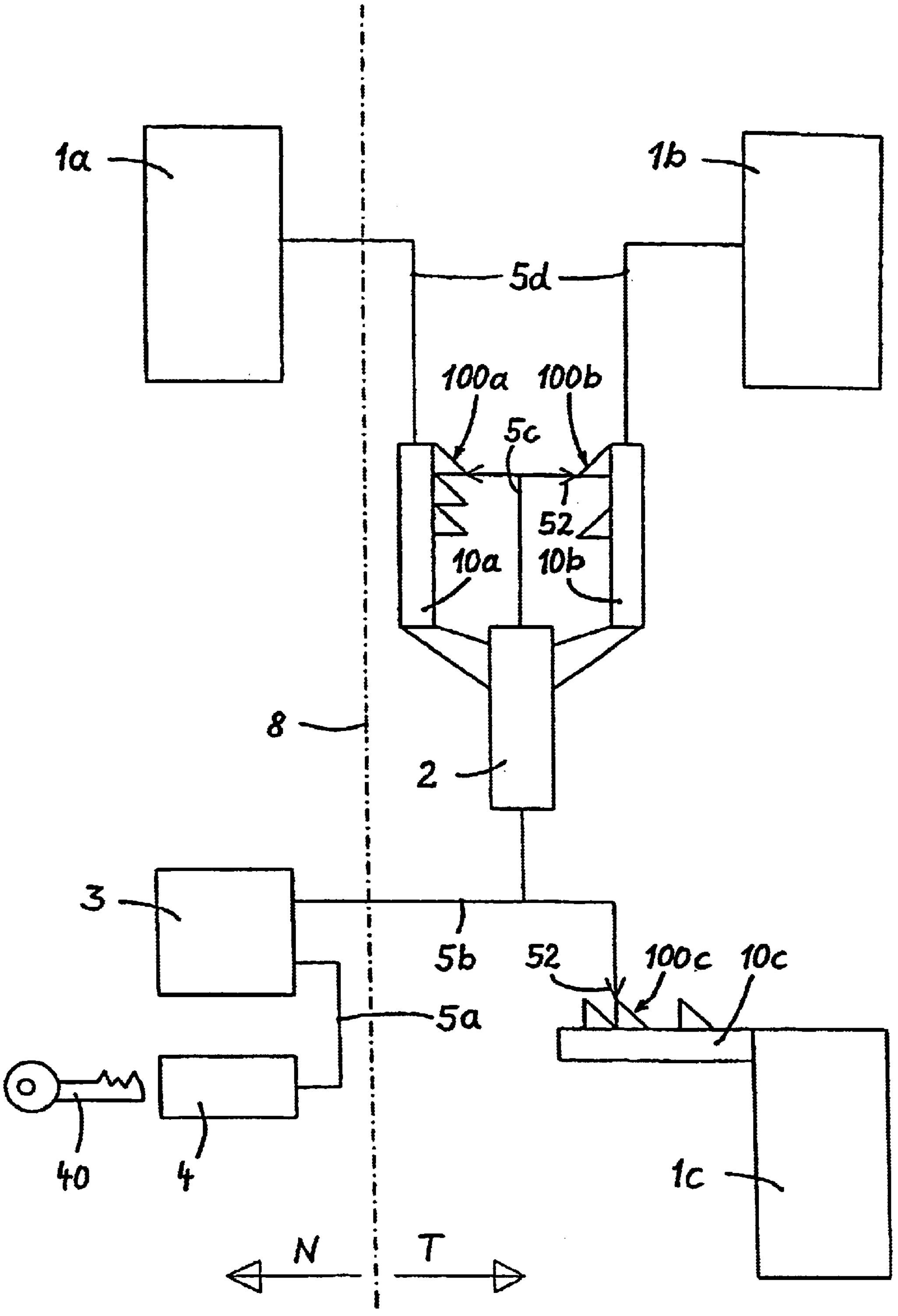
FIG. 1 shows a diagrammatic view of the mechanical active connections within a locking system of a vehicle door with three door openers wherein the means for determining the locking state for two door openers forms one structural unit with the motorized lock drive.

FIG. 1 shows diagrammatically a locking system which has mechanical active connections between an outer door opener 1*a*, two inner door openers 1*b*, 1*c*, a motorized lock drive 2, the primary locking mechanism 3, the locking cylinder 4 and the means for determining the locking state

100*a*, 100*b*, 100*c*, 52 for the individual door openers 1*a*, 1*b*, 1*c*. According to this embodiment, only the parts, namely the primary locking mechanism 3 with rotary catch and locking pawl, the locking cylinder 4 as well as the outer door opener 1*a*, are mounted in the wet space N of the vehicle door and which as a result of their function can only be placed there. The means 100*a*, 100*b*, 100*c*, 52 for determining the locking state are located in the dry space in the same way as the motorized lock drive 2. The illustrated locking system with outer door opener 1*a* and two inner door openers 1*b*, 1*c* is particularly suitable for a sliding door in a motor vehicle.

The means 100*a*, 100*b*, 52 for determining the locking state of the outer door opener 1*a* as well as the one inner door opener 1*b* form one structural unit with the lock drive 2. All the parts of the locking system are in connection with each other through the secondary locking mechanism 5*a*, 5*b*, 5*c*, 5*d* wherein the adjusting paths executed by the motorized lock drive 2 are always switched through up to the primary locking mechanism.

By secondary locking mechanism 5*a*, 5*b*, 5*c*, 5*d* is meant all those parts which interact only at the transfer of the setting paths and setting forces for operating the locking parts (primary locking mechanism) and which do not have to take up any locking forces. The secondary locking mechanism can comprise in particular Bowden cables, shear rod linkages and lever mechanisms.

Setting paths which start from one of the door openers 1*a*, 1*b*, 1*c*, unlike the setting paths executed by the lock drive 2, are only then switched through to the primary locking mechanism 3 if a mechanical coupling element 52 (see also FIGS. 3*a*–7) is located in the access position relative to the secondary locking mechanism 5*b*, 5*d* connected to the door opener 1*a*, 1*b*, 1*c*. Otherwise the active chain to the primary locking mechanism 3 is broken. Whether access of a door opener 1*a*, 1*b*, 1*c* to the coupling element 52 is or is not to take place depends on the locking state of the primary locking mechanism 3. If this is located for example in the "child lock" state then logically access on the side of the inner door opener 1*b*, 1*c* must be prevented, whilst operation through the outer door handle is to be permitted. From the "anti-theft security" state not only must lock activation be ruled out through the outer door handle 1*a*, but also through the inner door handles 1*b*, 1*c*. This anti-theft security action can only be lifted by operating the locking cylinder 4 through the appropriate key 40. Direct mechanical access through the secondary locking mechanism 5*a* thereby takes place to the parts of the primary locking mechanism 3 which lifts the blocking action. In order to ensure these marginal conditions a logic alignment takes place between the locking states of the primary and secondary locking mechanisms 3, 5, namely preferably after a setting command has been released through one of the door openers 1*a*, 1*b*, 1*c* or the locking button and after implementation of a setting movement produced by the motorized drive 2.

The logic described above of releasing or blocking the access on the part of a door opener 1*a*, 1*b*, 1*c* to the primary locking mechanism in dependence on its locking state can advantageously be reproduced by a mechanical scanning system whose function is not impaired by a current failure. Thus an emergency operation of the locking system is possible without impairing the security functions of the locking system.

The mechanical scanning can be undertaken by a scanner 52 which is connected to the secondary locking mechanism 5*b*, 5*c* and is guided from a curved path 100*a*, 100*b*, 100*c* or slide guide into the access position or into the blocking position.

Figures 2A, 2B:
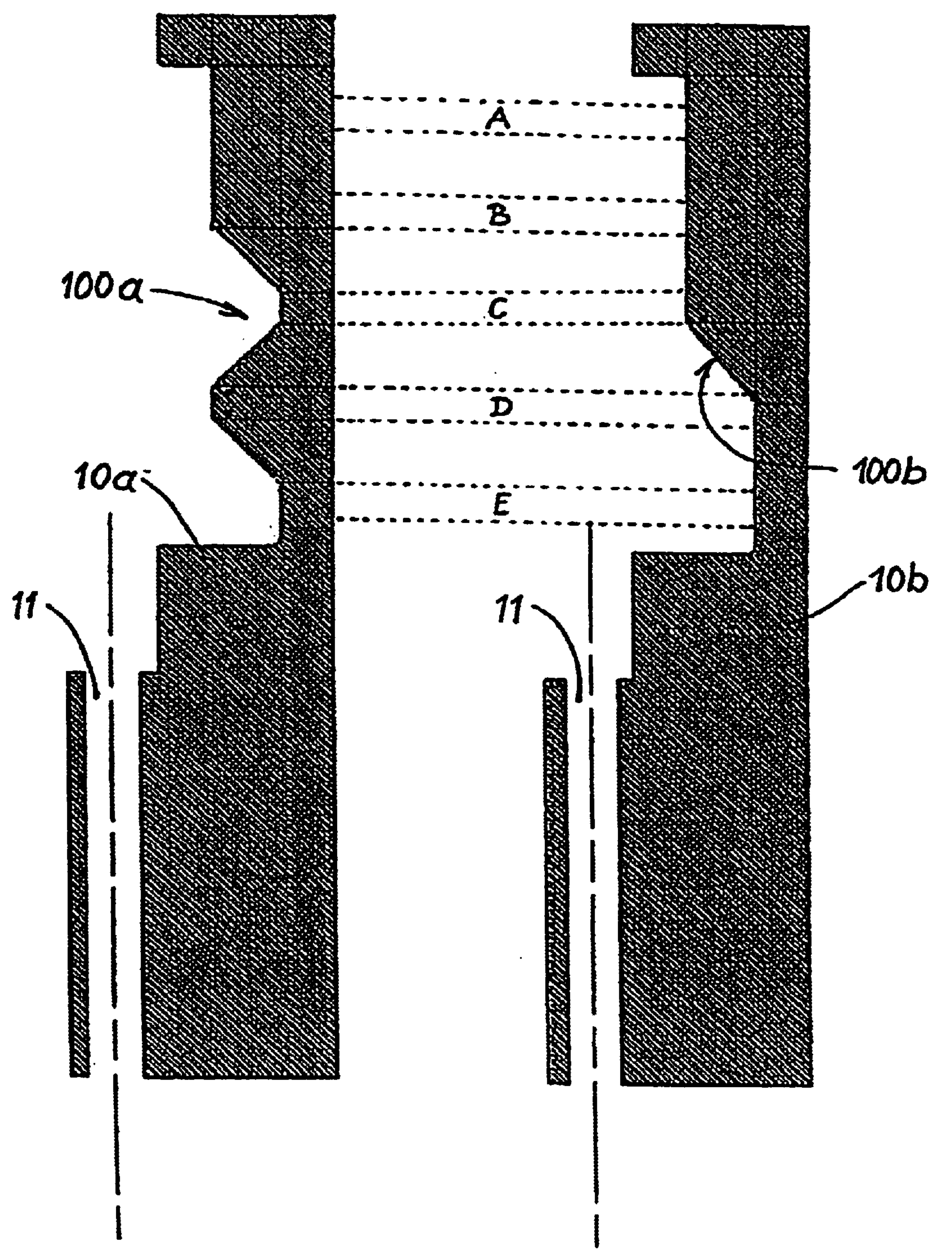
FIG. 2*a* shows a sectional view through that part of the means for determining the locking state which supports the curved path for reproducing the locking states permissible for the outside door handle.
FIG. 2*b* shows a sectional view through that part of the means for determining the locking state which supports the curved path for reproducing the locking states permissible for the inside door handle.

FIGS. 2*a* and 2*b* show sections through the base body 10*a*, 10*b*, which support a curved path 100*a*, 100*b* and are provided with a guide 11 for the displaceable pick-up of a coupling rod 50 (see FIGS. 3–7). Whilst the curved path 100*a* is associated with an outer door opener, the curved path 100*b* depicts the permissible locking functions for emergency operation in respect of an inner door opener. In regions A, B, E where the two curved paths 100*a*, 100*b* lie on the same level the two door openers have the same possibilities for access through to the locking mechanism 3 (FIG. 1). In the other regions C, D each one opener and each other opener is allowed access through to the primary locking mechanism, thus its actuation is permitted.

As can be seen from FIGS. 2*a* and 2*b* the curved paths 100*a*, 100*b* do not differ in regions A, B in which the lock (primary locking mechanism 3) is open or unlocked. Thus (particularly for region B) it is a matter that the locking system can be operated from both the outer door opener 1*a*, and from the inner door opener 1*b*, 1*c*. In region C on the other hand, in which the lock is locked (locking undertaken from the passenger cabin) a lock actuation can be established with the aim of unlocking only through the inner door opener 1*b*, 1*c*. The outer door opener 1*a* is out of function through its mechanical uncoupling.

In the region D of curved path 100*b* in which the lock is in the child-lock mode, access can only take place through the outer door opener 1*a*; the inner opener 1*b*, 1*c* is set out of function. The region E corresponds to the anti-theft security locking position in which a lock actuation through the door openers 1*a*, 1*b*, 1*c* is to be ruled out. Lifting this blocking function in the event of an on-board power failure is only possible by using the key 40 wherein access is through the locking cylinder 4 and the secondary locking mechanism 5*a* direct to the locking parts of the primary locking mechanism 3.

Figures 3A, 3B, 3C:
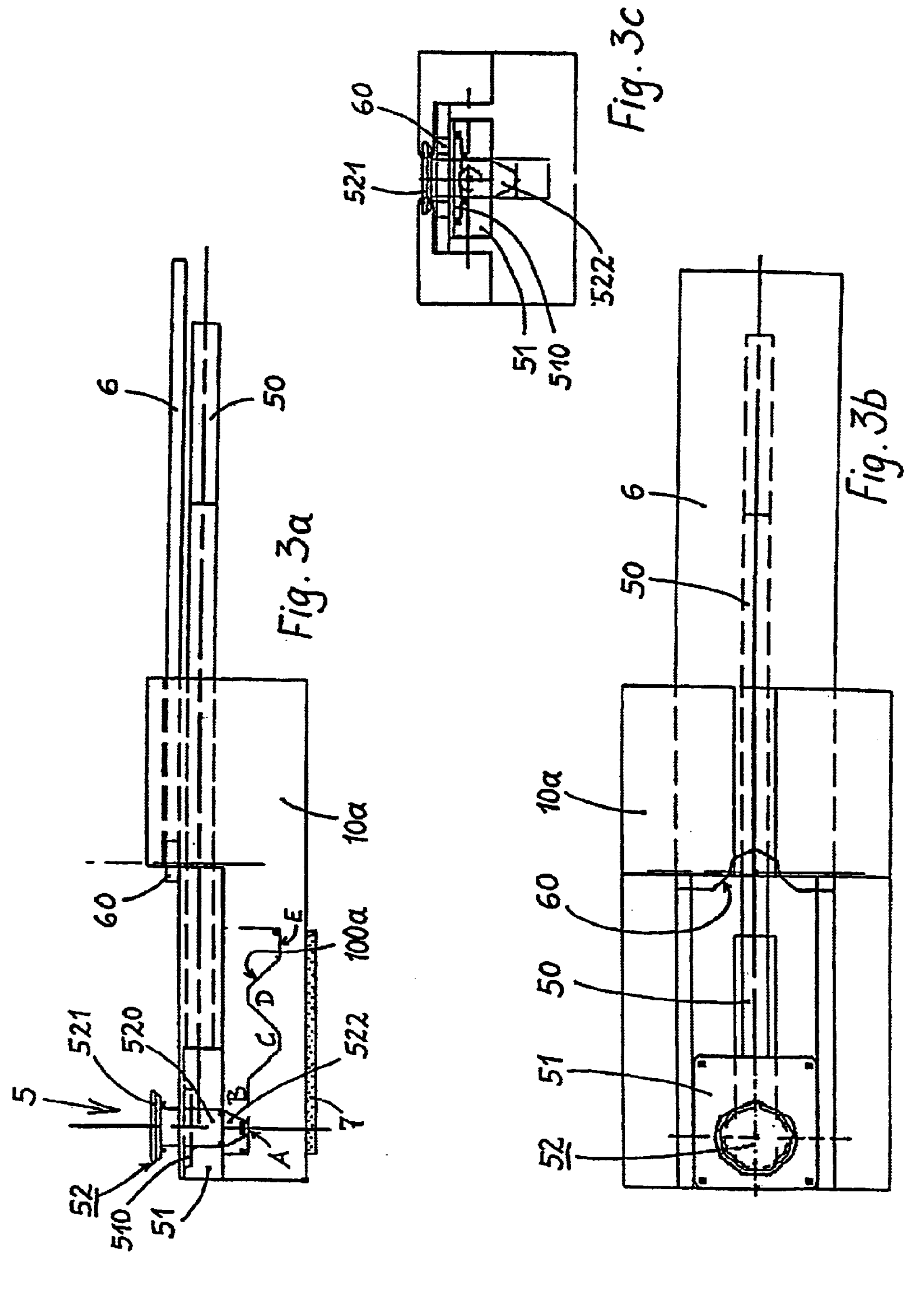
FIG. 3*a* shows a longitudinal section through the region of the locking system which in the event of failure of the on-board electrical power supply ensures a mechanical coupling between the door opener and the primary locking mechanism.
FIG. 3*b* shows the embodiment of FIG. 3*a* but in plan view.
FIG. 3*c* shows the embodiment of FIG. 3*a* but in cross-sectional view.

FIGS. 3*a* to 3*c* show different views of the previously described base body 10*a* with curved path 100*a* in combination with a scanner 52 whose shaft 520 is mounted axially displaceable in a slide block 51. A spring (not shown) ensures that the tip 522 of the scanner 52 is pressed against the contour of the curved path 100*a*. The slide block 51 is in turn mounted displaceable along the curved path 100*a* in a guide of the base body 10*a* whereby the displacement movement is transferred by a coupling rod 50 which belongs to the secondary locking mechanism 5*c* and is connected to the lock drive 2.

The scanner 52 is displaced in an associated region A, BP C, D, E, of the curved path 100*a* in dependence on the locking position of the primary locking mechanism 3. According to FIG. 3*a* this is the "open" position which corresponds with the positions shown in FIG. 8*a* of the rotary-catch 3*a* and the locking pawl 3*b* (primary locking mechanism 3). If now the door is slammed shut then the rotary catch 3*a* and the locking pawl 3*b* are moved into the positions shown in FIG. 8*c* whereby the secondary locking mechanism (coupling rod 50) coupled to the locking pawl 3*b* moves the slide block 51 with the scanner 52 into the region B which corresponds to the "unlocked" locking position.

Also in region B the scanner 52 is situated in a position which releases a part of its shaft 520 adjoining the head 521 for access through the fork 60 of the slider 6 connected to the outer door handle 1*a*. During actuation of the outer handle 1*a* the scanner 52 is thus displaced by the slider 6 through the entrainment of the slide block 51 and the coupling rod 50 back into the region A which leads to release of the locking pawl 3*b* and thus release of the rotary catch 3*a*.

If on the other hand the locking system is locked from inside in order to prevent a third party from entering into the vehicle then the scanner 52 passes into the region C where it projects by its head 521 into a recess 510 of the slide block 51. There is now no possibility of access to the scanner 52 through the push rod 6; a mechanical coupling between the outer handle 1*a* and the primary locking mechanism can thus not be established. Consequently the actuation of the outer door handle 1*a* remains inactive.

FIGS. 4 to 7 show a small selection from the numerous combination possibilities between the different door handles 1*a*, 1*b*, the regions A, B, C, D, E, of the curved path 100*a*, 100*b* as well as the motorized and manual operation of the locking system in the area of determining the locking state where a decision is made on releasing or blocking the coupling of manually triggered setting paths.

FIGS. 4 and 7 show the "anti-theft security" locking position for the outside door handle 1*a* and the inside door handle 1*b* in which the scanner 52 offers no possibility of access for the sliders 6 connected to the door handles 1*a*, 1*b*. Both door handles 1*a*, 1*b* are thus switched inactive. As already mentioned elsewhere, this blocking action can only be lifted through operating the door lock 4.

FIG. 5 shows the "open" state (region A) wherein one of the previous states according to regions B, C, or D was reached through motorization. When the door was opened the scanner 52 ultimately passed into region A.

FIG. 6 shows an emergency operation of the locking system by means of initiating the setting motion starting from a door handle 1*a*, 1*b* through the slider 6 and the scanner 52 to the coupling rod 50 connected to the primary locking mechanism. For this it was necessary for the scanner 52 for the fork 50 of the slider 6 to be located in an access position, thus was lifted through the slide guide 100*a*, 100*b*. This is the case according to the embodiment of FIGS. 2*a* and 2*b* for the outer door handle 1*a* in the regions B and D and for the inner door handle in regions B and C.

Figure 8B:
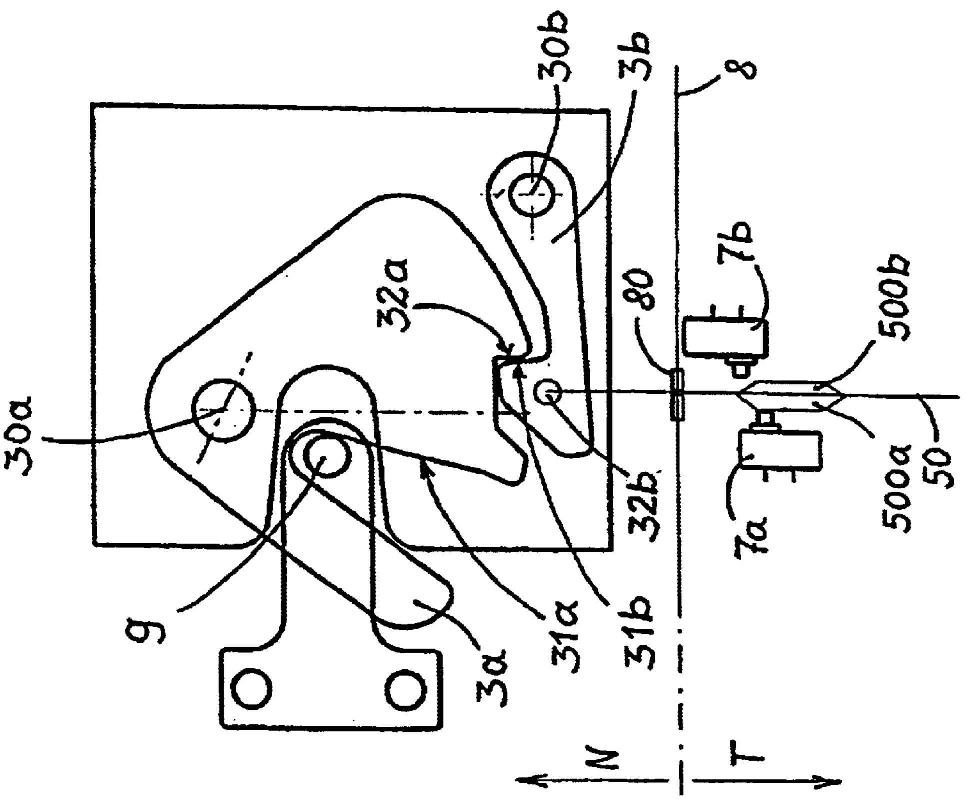
FIG. 8*b* shows the embodiment of FIG. 8*a*, but in the locking state for the pre-catch position.
Figure 8A:
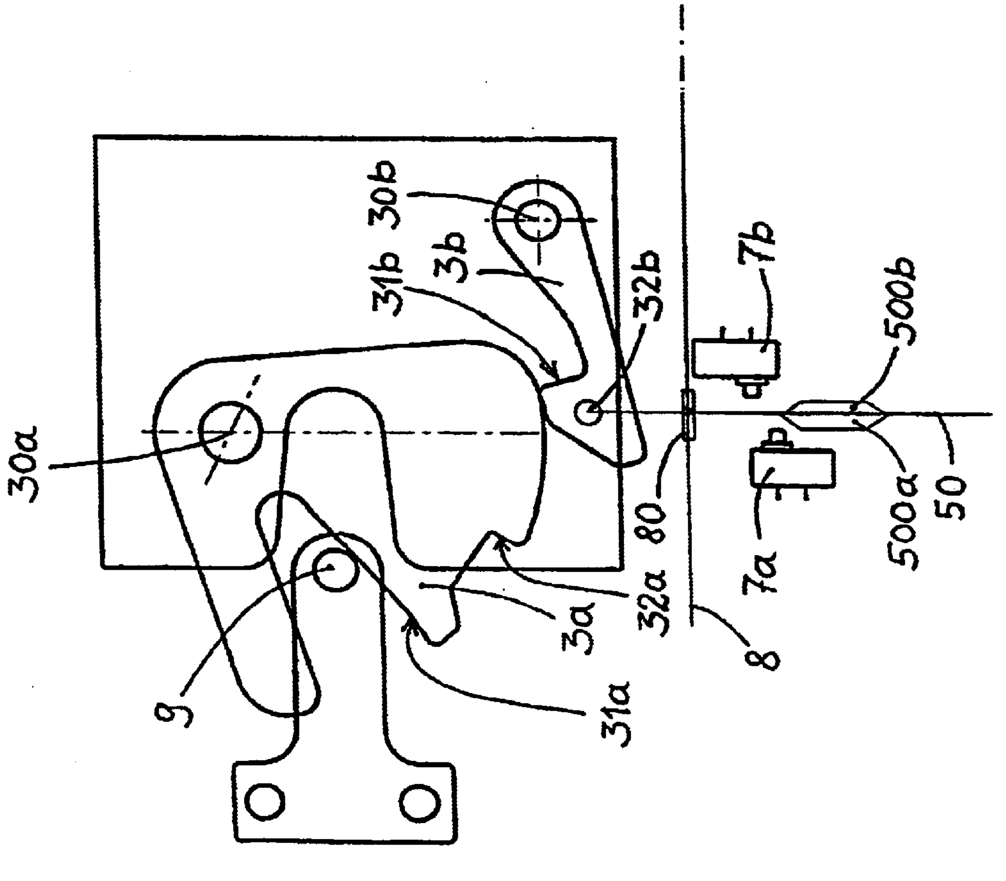
FIG. 8*a* shows a view of the primary locking mechanism in the "Open" locking state with means for detecting the locking state in the dry space.
Figure 8C:
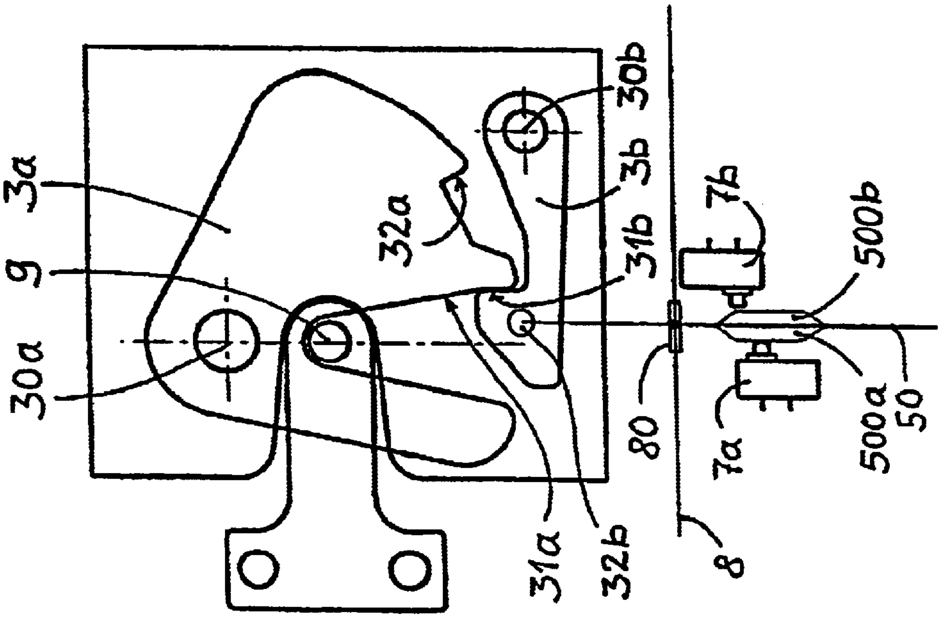
FIG. 8*c* shows the embodiment of FIG. 8*a* but in the locking state for the "main catch position"

The embodiment of FIGS. 8*a* to 8*c* shows the primary locking parts, namely the rotary catch 3*a* and the locking pawl 3*b* as well as the locking element 9 on the body side in dependence on the locking position in different positions relative to each other. The position in FIG. 8*a* corresponds to the "open" locking position. The free end of the locking pawl 3*b* which is swivel mounted in the axis 30*b* and is elastically pretensioned in the direction of the rotary catch 3*a* adjoins the outer contour of the rotary catch 32*a*. The locking pawl 3*b* is connected through a fixing point 32*b* to an element 50 of the secondary locking mechanism (e.g. in the form of a rod linkage) which is guided through a sealing element 80 of a wet/dry space partition 8 from the wet space N into the dry space T.

On the dry space side T the coupling rod 50 has two position generators 500*a*, 500*b* associated with separate position recorders 7*a*, 7*b*. In the "open" locking position no signal is generated since none of the position generators 500*a*, 500*b* enters into interaction with a position recorder. Suitable position recorders are micro switches as well as sensors operating without contact, such as Hall elements.

When the locking element 9 on the body side enters into the rotary catch 3*a* it passes against the locking stop 31*a* and swivels the rotary catch 3*a* about the axis 30*a*. If the closing movement of the vehicle door is not completely terminated, as shown in FIG. 8*b*, then first the locking hook 31*b* of the locking pawl 3*b* and then the stop 32*a* of the rotary catch 3*a* move into engagement with each other. The swivel movement of the locking pawl 3*b* which is thereby executed brings the position generator 500*a* into active connection with the position recorder 7*a* so that a signal is generated. As a result of this signal which detects the so-called pre-catch position a motorized pull-to assistance can be activated which undertakes a proper closing of the vehicle door. Naturally this signal can also be used for the information of the driver or the relevant passenger that the vehicle door has not yet been properly closed.

FIG. 8*c* shows the positions of the rotary catch 3*a* and the locking pawl 3*b* when the door is properly closed. Now the locking hook 31*b* engages behind the locking stop 31*a* of the rotary catch 3*a* whereby the locking pawl 3*b* has executed further swivel movement in the direction of the rotary catch 3*a*. The relative movement of the coupling rod 50 connected therewith now also triggers a signal in the case of the position recorder 7*b*.

Figure 9:
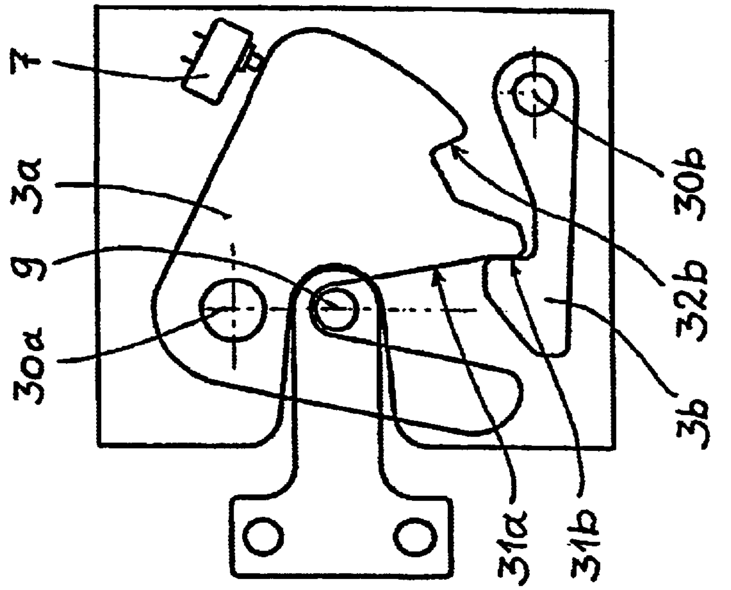
Fig. 9 PRIOR ART
FIG. 9 is a view of a primary locking mechanism in the "Locked" locking state with means for determining the locking state in the wet space according to the prior art already known.

FIG. 9 shows according to the prior art a primary locking mechanism 3*a*, 3*b* having a position recorder 7 in the form of a micro switch which is associated with the outer contour of the rotary catch. Owing to the association between the primary locking mechanism 3*a*, 3*b* and the wet space N it is necessary to use the position recorder 7 in a comparatively expensive wet space design.

What is claimed is:

1. An electronically operated locking system for a motor vehicle door comprising:

an outer door opener, at least one inner door opener and a locking mechanism that is adjustable by a motorized drive and has locking parts of a primary locking mechanism for locking the vehicle door, the locking mechanism further having a secondary locking mechanism; a wet/dry space partition forming a wet space and a dry space in the vehicle door wherein the locking parts of the primary locking mechanism are arranged in the wet space of the vehicle door; and electrical or electronic means for determining a locking state of the primary locking mechanism and the secondary locking mechanism, wherein the means for determining the locking state of the primary and secondary locking mechanism and the motorized drive are mounted in the dry space, wherein the means for determining the locking state of the primary locking mechanism are arranged between the locking parts and the motorized drive, wherein the means for determining the locking state of the secondary locking mechanism are mounted between the motorized drive and at least one of the inner door opener and the outer door opener, and wherein the locking parts of the primary locking mechanism are connected to the means for determining the locking state of the primary locking mechanism through an element of the secondary locking mechanism which is guided in a seal of the wet/dry space partition from the wet space into the dry space of the vehicle door.

2. The locking system according to claim 1 wherein the element is a movable coupling element and wherein the means for determining the locking state of the primary locking mechanism have at least one position generator which is mounted on the movable coupling element which is connected to a locking part, and at least one position recorder fixed on a door body wherein the coupling element engages through a passage in the wet/dry space partition.

3. The locking system according to claim 2 wherein the passage of the coupling element through the wet/dry space partition is sealed by the seal.

4. The locking system according to claim 2, wherein the coupling element operates the lock.

5. The locking system according to claim 1 wherein the means for determining the locking state of the secondary locking member can be brought into active relation with a scanner which is pretensioned spring elastically against a curved path which depicts a plurality of locking states, wherein the scanner or a part connected thereto serves as an entrainment member for transferring an operating force from at least one of the inner door opener and the outer door opener.

6. The locking system according to claim 5 wherein the scanner can occupy two end positions of which one is provided for coupling and the other for uncoupling the element which transfers an adjusting movement.

7. The locking system according to claim 5 wherein at least one permanent magnet is provided to control end positions of the scanner and the scanner is pretensioned spring elastically against an active direction of the permanent magnet.

8. The locking system according to claim 1, wherein the means for determining the locking state of at least one of the primary locking mechanism and the secondary locking mechanism is at least one of a magneto-resistive sensor and an optical sensor.

9. The locking system according to claim 1 wherein when the locking system is in an "anti-theft security" state, a mechanical connection is established between a locking cylinder and the primary locking mechanism so that a scanner is moved by the locking cylinder into an access position for engaging an adjusting movement from the outer door opener.

10. The locking system according to claim 1 further comprising means for carrying out a logic alignment between a locking state of the primary locking mechanism and a locking state of the secondary locking mechanism so that certain locking functions are blocked or released for control in dependence on the result of this logic alignment.

11. The locking system according to claim 10 wherein the means for carrying out the logic alignment are formed as at least one of electric means and mechanical means.

* * * * *